(12) United States Patent
Haubeil

(10) Patent No.: US 6,485,095 B2
(45) Date of Patent: Nov. 26, 2002

(54) TRANSPORTABLE SEAT SYSTEM

(76) Inventor: Albert R. Haubeil, 757 Eastern Ave., Chillicothe, OH (US) 45601

( * ) Notice: Subject to any disclaimer, the term of this patent is extended or adjusted under 35 U.S.C. 154(b) by 0 days.

(21) Appl. No.: 09/833,522

(22) Filed: Apr. 10, 2001

(65) Prior Publication Data

US 2002/0145311 A1 Oct. 10, 2002

(51) Int. Cl.$^7$ ............................ A47C 9/10; A47C 4/30; A47D 1/02
(52) U.S. Cl. ........................ 297/16.1; 297/4; 297/16.2; 297/17; 224/155
(58) Field of Search ............................... 297/16.1, 16.2, 297/17, 4, 183.1; 224/155

(56) References Cited

U.S. PATENT DOCUMENTS

| | | | | |
|---|---|---|---|---|
| 774,873 A | * | 11/1904 | Fuchs | 297/4 |
| 2,375,819 A | * | 5/1945 | Reid | 297/16.1 X |
| 2,550,352 A | * | 4/1951 | Hodgson et al. | 297/16.1 |
| 3,414,323 A | * | 12/1968 | Mitchum | 297/4 X |
| 3,730,294 A | | 5/1973 | Thurmond | |
| 3,895,839 A | * | 7/1975 | Amato | 297/4 |
| 3,927,733 A | * | 12/1975 | Wurn et al. | 182/187 |
| 4,671,566 A | * | 6/1987 | Knapp et al. | 297/16.2 |
| 4,673,211 A | * | 6/1987 | Hoffman | 297/16.2 |
| 4,795,068 A | * | 1/1989 | Blean | 224/155 |
| 4,824,167 A | * | 4/1989 | King | 297/16.1 X |
| 4,836,601 A | * | 6/1989 | Cone | 297/16.2 |
| 4,930,839 A | * | 6/1990 | Saito et al. | 297/4 X |
| 5,429,413 A | * | 7/1995 | Levy et al. | 297/16.2 X |
| 5,435,620 A | * | 7/1995 | Cheng | 297/16.1 X |
| 5,445,301 A | | 8/1995 | Biedenharn, Jr. | |
| 5,496,094 A | * | 3/1996 | Schwartzkopf et al. | 297/16.1 X |
| 5,547,246 A | * | 8/1996 | Lambert | 297/4 X |
| 5,607,089 A | * | 3/1997 | Strum | 297/16.1 X |
| 5,628,437 A | * | 5/1997 | Kober | 224/155 |
| 5,720,522 A | * | 2/1998 | Habeck | 297/4 X |
| 5,893,604 A | * | 4/1999 | Yao | 297/16.1 |
| 6,081,942 A | * | 7/2000 | Bellamy | 297/17 X |
| 6,106,056 A | * | 8/2000 | Wegner | 297/16.1 |
| 6,332,646 B1 | * | 12/2001 | Tseng | 297/16.1 |
| 6,347,406 B1 | * | 2/2002 | Jones et al. | 297/4 X |

FOREIGN PATENT DOCUMENTS

| | | | | |
|---|---|---|---|---|
| DE | 228378 | * | 11/1910 | 297/16.1 |
| GB | 2203937 A | * | 11/1988 | 297/16.1 |
| WO | WO 88/06019 | * | 8/1988 | 297/16.1 |

* cited by examiner

Primary Examiner—Rodney B. White
(74) Attorney, Agent, or Firm—Michael S. Neustel

(57) ABSTRACT

A transportable seat system that is lightweight and foldable into a compact transporting position. The transportable seat system includes a lower frame, an upper frame pivotally attached about the lower frame, a bar member extending within the frames, a cover attached to the bar member and positioned about portions of the frames, and a strap attached to the frames for allowing convenient transporting of the same. An upper portion of the lower frame is preferably angled forwardly to assist in the transfer of the weight of a user to a central position about the lower frame.

20 Claims, 6 Drawing Sheets

TRANSPORTABLE SEAT SYSTEM

BACKGROUND OF THE INVENTION

1. Field of the Invention

The present invention relates generally to seat devices and more specifically it relates to a transportable seat system that is lightweight and foldable into a compact transporting position.

2. Description of the Prior Art

Seat devices have been in use for years. A conventional seat devices is comprised of four legs supporting a seat portion along with a backrest. Because of the requirement to have four or more legs and a backrest, conventional seat devices are typically bulky and awkward to utilize for individuals who travel in rugged terrain. Another problem with conventional seat devices is that they not suitable for transporting over significant distances.

Examples of patented seat devices which are illustrative of such prior art include U.S. Pat. No. 3,730,294 to Thurmond; U.S. Pat. No. 3,927,733 to Wurn et al; U.S. Pat. No. 4,795,068 to Blean; U.S. Pat. No. 5,445,301 to Biedenharn, Jr; U.S. Pat. No. 5,628,437 to Kober.

While these devices may be suitable for the particular purpose to which they address, they are not as suitable for providing a seat device that is lightweight and foldable into a compact transporting position. Conventional seat devices are either rigid in structure (i.e. non-foldable) or are bulky in structure.

In these respects, the transportable seat system according to the present invention substantially departs from the conventional concepts and designs of the prior art, and in so doing provides an apparatus that is lightweight and foldable into a compact transporting position.

SUMMARY OF THE INVENTION

In view of the foregoing disadvantages inherent in the known types of seat devices now present in the prior art, the present invention provides a new transportable seat system construction wherein the same is lightweight and foldable into a compact transporting position.

The general purpose of the present invention, which will be described subsequently in greater detail, is to provide a new transportable seat system that has many of the advantages of the seat devices mentioned heretofore and many novel features that result in a new transportable seat system which is not anticipated, rendered obvious, suggested, or even implied by any of the prior art seat devices, either alone or in any combination thereof.

To attain this, the present invention generally comprises a lower frame, an upper frame pivotally attached about the lower frame, a bar member extending within the frames, a cover attached to the bar member and positioned about portions of the frames, and a strap attached to the frames for allowing convenient transporting of the same. An upper portion of the lower frame is preferably angled forwardly to assist in the transfer of the weight of a user to a central position about the lower frame.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a transportable seat system that will overcome the shortcomings of the prior art devices.

A second object is to provide a transportable seat system that is lightweight and foldable into a compact transporting position.

Another object is to provide a transportable seat system that easy to carry and transport for most individuals.

An additional object is to provide a transportable seat system that supports an individual above a ground surface.

A further object is to provide a transportable seat system that does not require any securing devices.

Another object is to provide a transportable seat system that utilizes a pre-existing vertical structure such as a tree to assist in supporting the seat structure.

A further object is to provide a transportable seat system that is positionable upon various types of terrain and that does not require a flat terrain.

Another object is to provide a transportable seat system that is comfortable and secure to sit upon.

A further object is to provide a transportable seat system that is usable by hunters, fisherman, campers, hikers, photographers, and other people interested in the outdoors.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
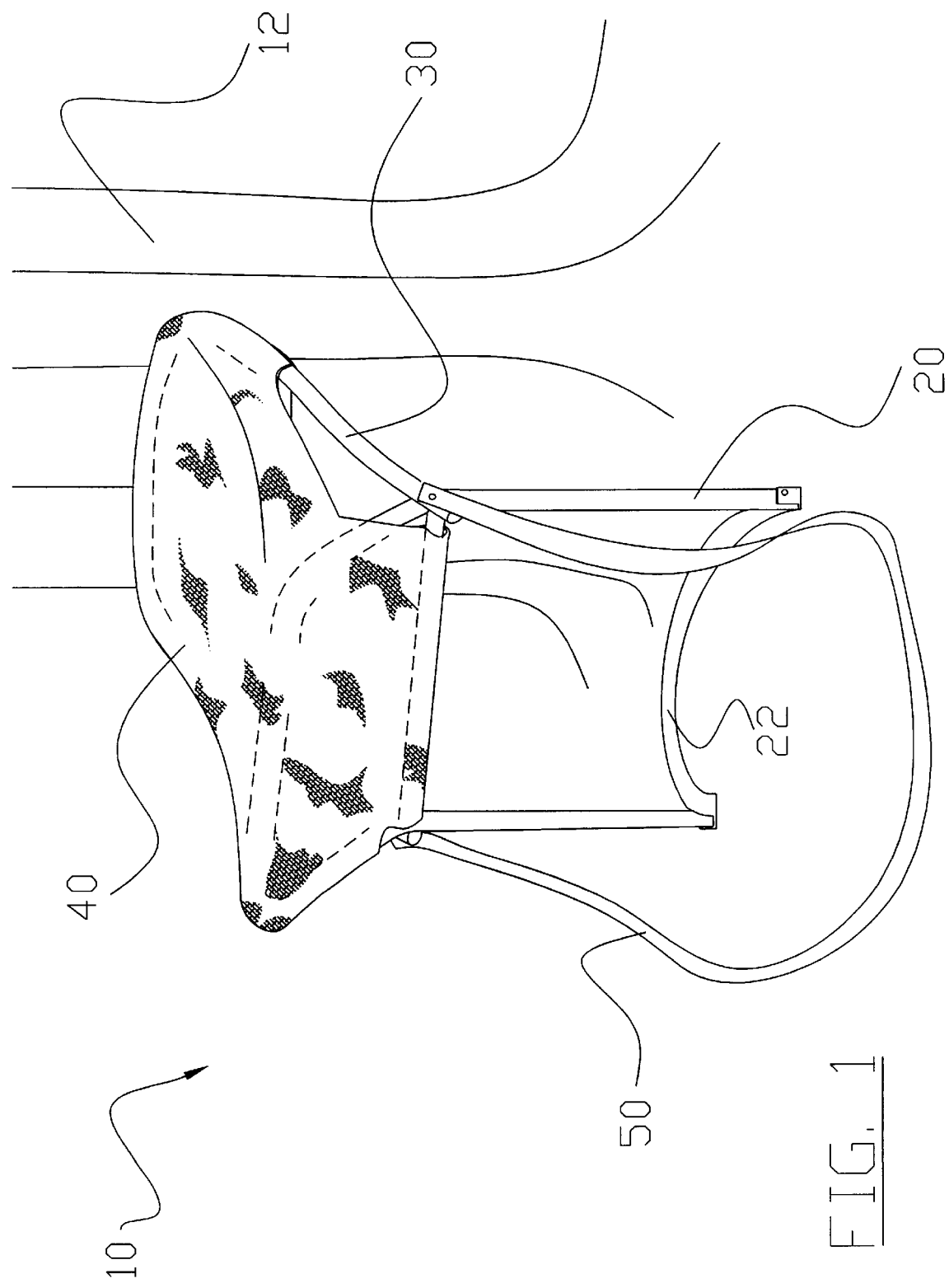
FIG. 1 is an upper perspective view of the present invention positioned against a tree.

Turning now descriptively to the drawings, in which similar reference characters denote similar elements throughout the several views, FIGS. 1 through 6 illustrate a transportable seat system 10, which comprises a lower frame 20, an upper frame 30 pivotally attached about the lower frame 20, a bar member 60 extending within the frames, a cover 40 attached to the bar member 60 and positioned about portions of the frames, and a strap 50 attached to the frames for allowing convenient transporting of the same. An upper portion of the lower frame 20 is preferably angled forwardly to assist in the transfer of the weight of a user to a central position about the lower frame 20.

Figure 3:
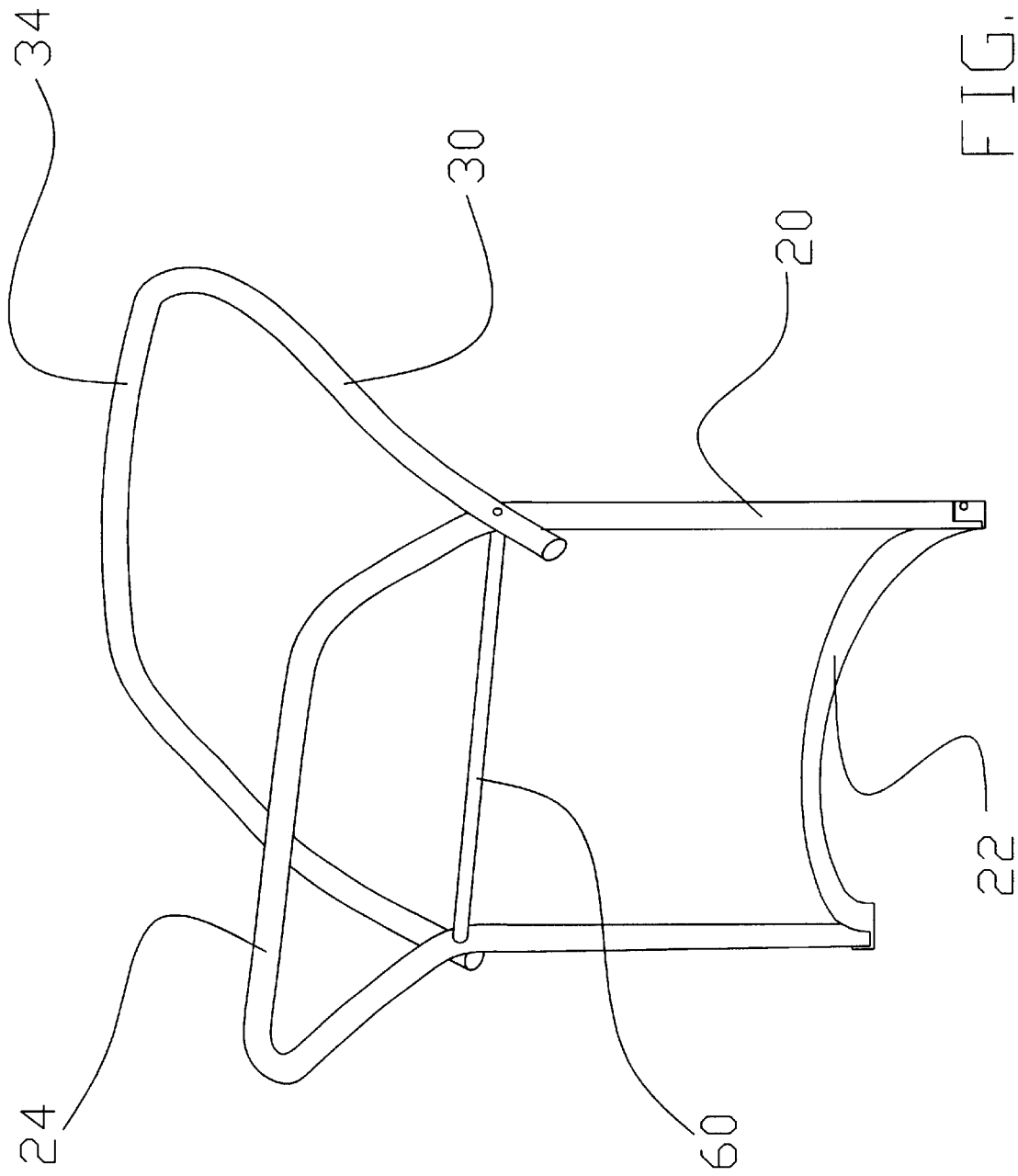
FIG. 3 is an upper perspective view of the present invention with the cover removed.
Figure 4:
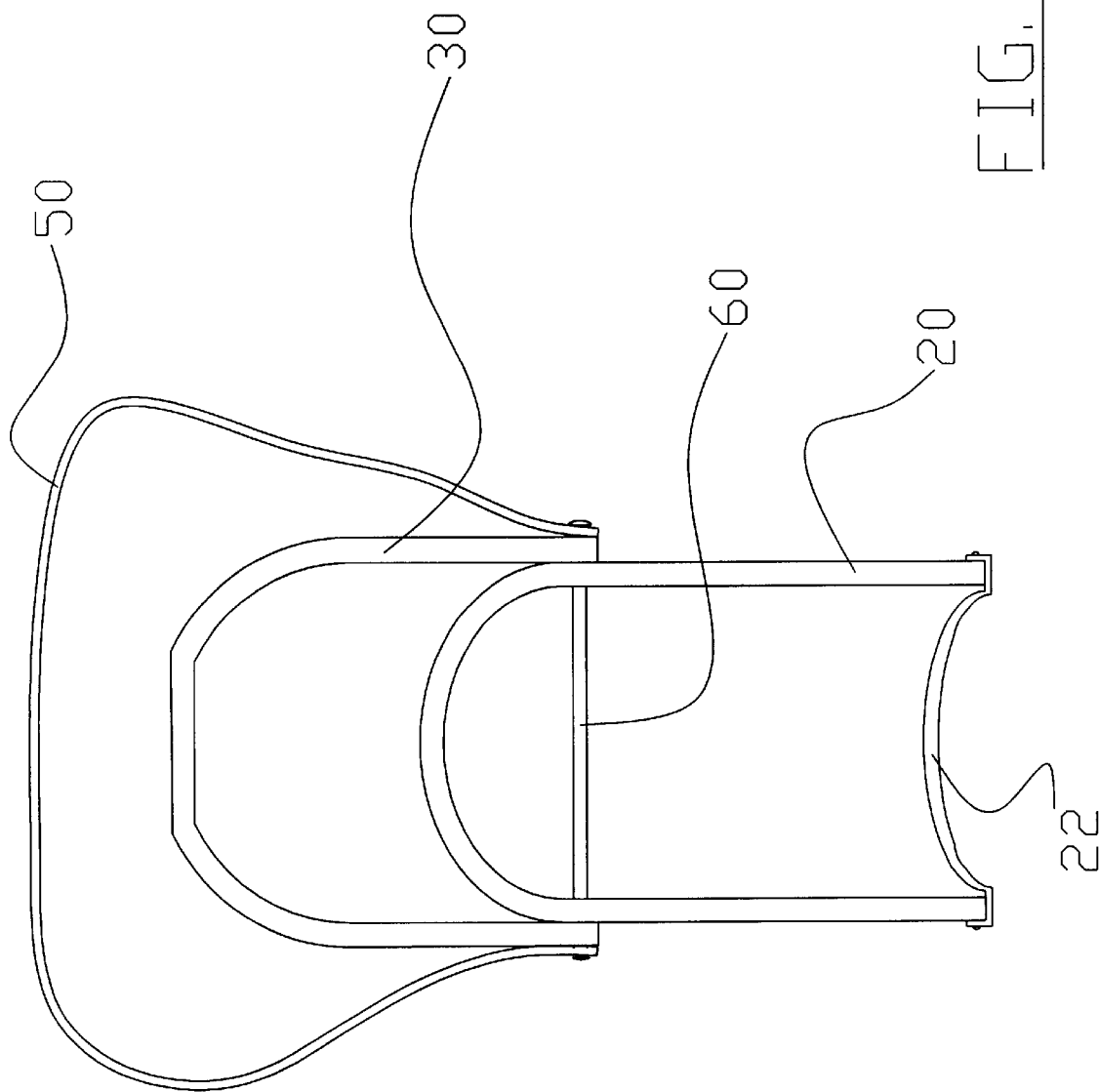
FIG. 4 is a front view of the present invention in an expanded position with the cover removed.
Figure 6:
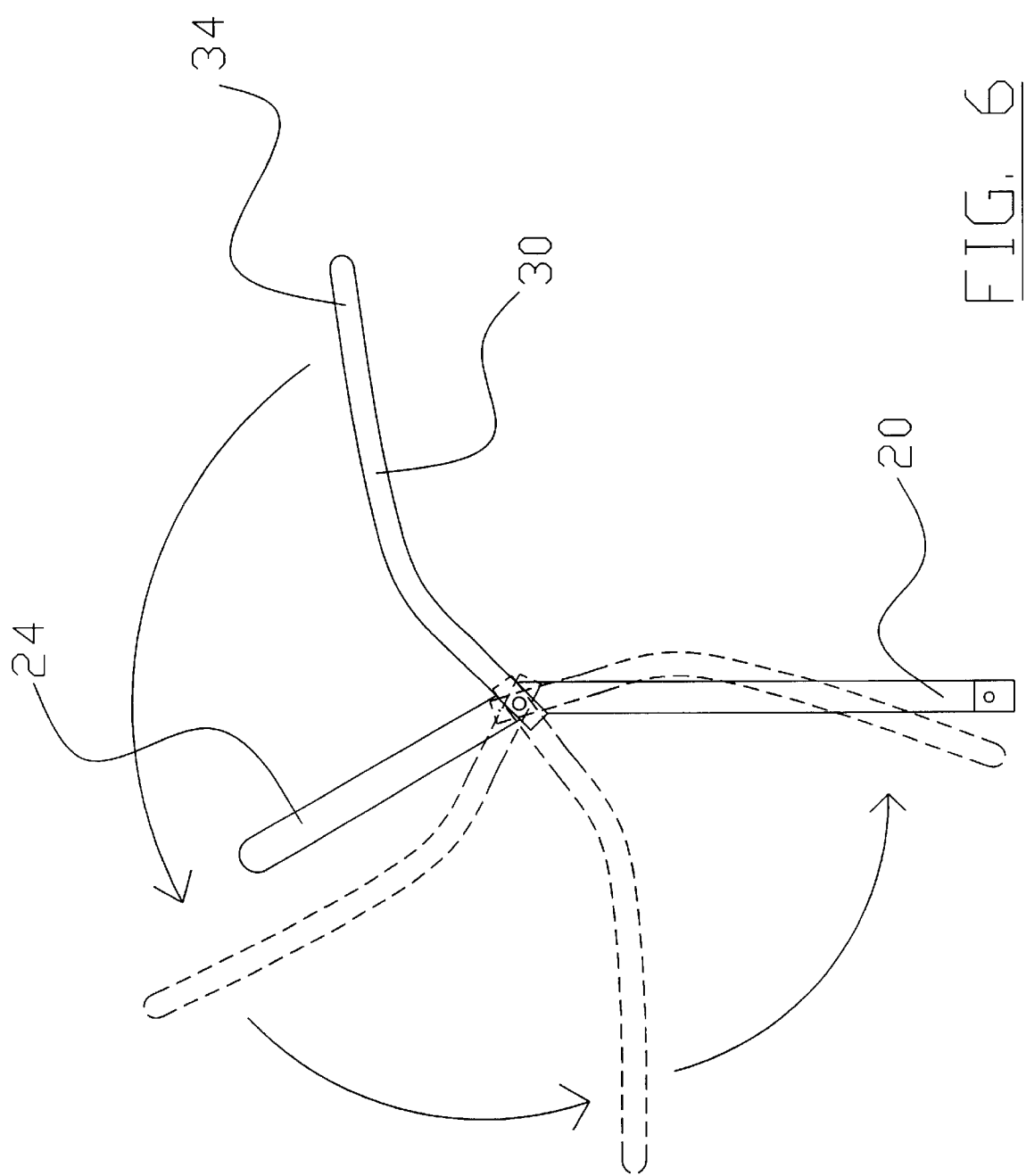
FIG. 6 is a side view illustrating the movement of the upper frame about the lower frame.

As shown in FIGS. 1, 3 and 4 of the drawings, the lower frame 20 is generally comprised of an inverted U-shaped structure having a pair of extended portions serving as legs and a first enclosed end 24. As further shown in FIGS. 1, 3 and 4 of the drawings, the lower frame 20 includes a cross member 22 extending between the lower portions of the lower frame 20 to provide increased stability to the extended portions. As best illustrated in FIG. 6 of the drawings, the upper portion of the lower frame 20 is preferably angled forwardly to assist in the transfer of the weight of a user to a central position about the lower frame 20.

As shown in FIGS. 1 and 4 of the drawings, the lower frame 20 preferably has a width sufficient to provide support to an individual sitting upon the transportable seat system 10. The lower frame 20 may be constructed of various types of materials and structures that are commonly utilized within the industry.

Figure 2:
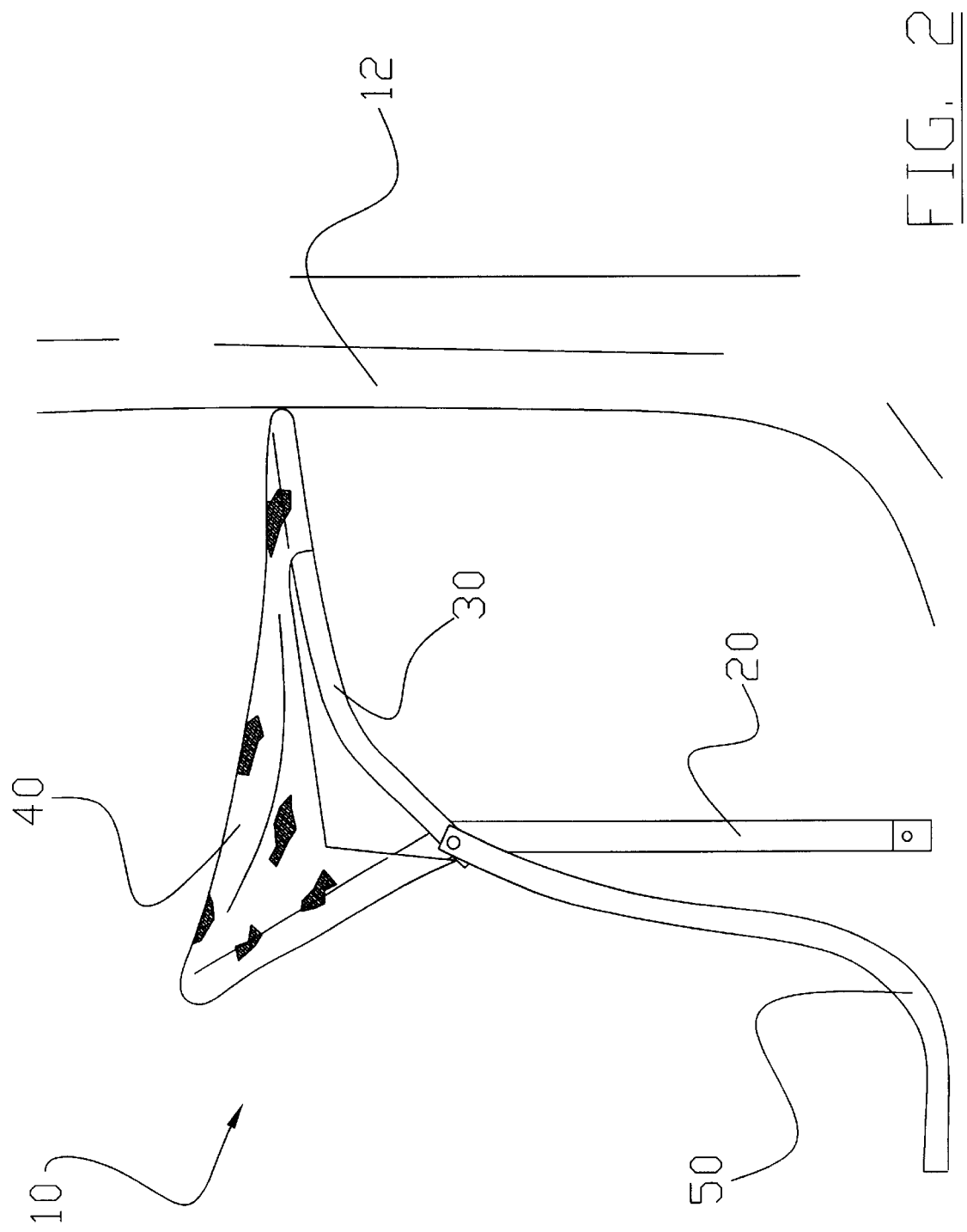
FIG. 2 is a view of the present invention positioned against a tree.

As shown in FIGS. 1, 3, 4 and 5 of the drawings, the upper frame 30 is comprised of a U-shaped structure similar to the lower frame 20 having a second enclosed end 34. The distal portions of upper frame 30 are pivotally attached about an upper-middle portion of the lower frame 20 as best illustrated in FIGS. 1, 2 and 6 of the drawings. The upper member preferably is angled as best illustrated in FIGS. 2 and 6 of the drawings.

Figure 5:
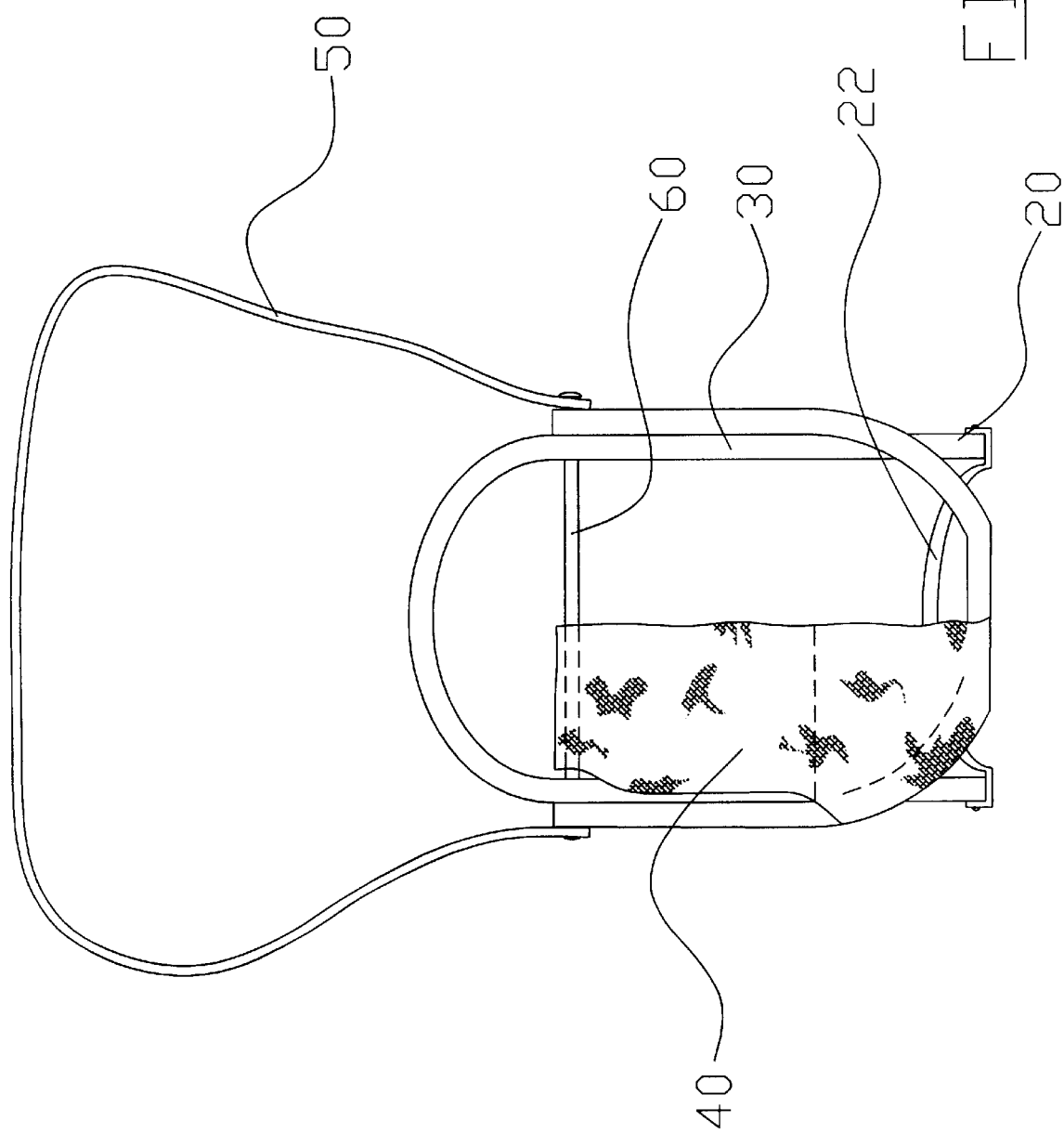
FIG. 5 is a front view of the present invention in a compact storage position with the cover partially removed.

A bar member 60 or similar structure extends between the upper frame 30 and the lower frame 20 as best illustrated in FIGS. 3, 4 and 5 of the drawings. The bar member 60 is preferably utilized to pivotally attach the upper frame 30 to the lower frame 20 as best illustrated in FIG. 5 of the drawings. The bar member 60 may be comprised of an elongate structure.

As shown in FIGS. 1, 2 and 5 of the drawings, a cover 40 is attached about the bar member 60 and the second enclosed end 34 of the upper frame 30. The cover 40 extends about the first enclosed end 24 of the lower frame 20 as best shown in FIGS. 1 and 2 of the drawings. When the transportable seat system 10 is positioned within the expanded position as shown in FIGS. 1 and 2 of the drawings, the cover 40 is preferably relatively taut about the upper frame 30 and lower frame 20 thereby maintaining the upper frame 30 in a relatively horizontal position to engage an upright object such as a tree 12. The user thereafter is able to sit upon the cover 40 with their weight fully supported upon thereof. The cover 40 may be constructed of various well-known materials and fabrics as can be appreciated.

As shown in FIGS. 1, 2, 4 and 5 of the drawings, the strap 50 may be attached to either or both of the frames 20, 30 to allow for easy transportation when in the compact transportation position. The strap 50 may be constructed of various materials and may be comprised of various lengths.

In use, the user locates an upright structure such as but not limited to a tree 12 hen they desire to sit. The user then positions the lower frame 20 a finite distance from the tree 12 as best shown in FIG. 2 of the drawings. The user then unfolds the upper frame 30 with respect to the lower frame 20 so that the upper frame 30 is substantially horizontal with respect to a ground surface and supported by the tension within the cover 40 as best shown in FIG. 2 of the drawings. The user then positions the second enclosed end 34 of the upper frame 30 adjacent to and abutting the tree 12 as further shown in FIGS. 1 and 2 of the drawings. The user then is able to sit upon the cover 40 thereby applying a downward force upon the lower frame 20 and the upper frame 30. The downward force upon the upper frame 30 provides a torque upon the lower frame 20 attempting to pull the lower frame 20 towards the tree 12 but the upper frame 30 prevents the upper frame 30 from moving. When the user is finished utilizing the transportable seat system 10, the user simply folds the upper frame 30 about the lower frame 20 as shown in FIG. 6 of the drawings. When in the folded position, the upper frame 30 is substantially parallel to the lower frame 20 forming a compact structure that is easily transported.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A transportable seat system, comprising:
   a lower frame having a lower portion and an upper portion;
   an upper frame having an inner portion and an outer portion, wherein said inner portion is pivotally attached to said upper portion of said lower frame at a pivot point;
   a bar member extending between said lower frame and said upper frame at said pivot point; and
   a cover having a first end and a second end, wherein said cover is attached about said lower frame and said upper frame;
   wherein said upper frame is substantially traverse to said lower frame when in an expanded position and wherein said upper frame is substantially parallel to said lower frame when in a compact position.

2. The transportable seat system of claim 1, wherein said first end of said cover is attached about said bar member and wherein said second end of said cover is attached about said outer portion of said upper frame.

3. The transportable seat system of claim 1, wherein said upper portion of said lower frame is angled frontwardly from said lower portion of said lower frame.

4. The transportable seat system of claim 1, wherein said lower frame has an inverted U-shaped structure.

5. The transportable seat system of claim 1, wherein said upper frame has a U-shaped structure.

6. The transportable seat system of claim 1, wherein said lower frame includes a pair of extended leg portions.

7. The transportable seat system of claim 6, including a cross member extending between said pair of extended leg portions.

8. The transportable seat system of claim 1, wherein said outer portion of said upper frame is angled with respect to said inner portion.

9. The transportable seat system of claim 1, wherein said cover is taut about said upper portion of said lower frame when said upper frame is in said expanded position.

10. The transportable seat system of claim 1, including a strap attached to said upper frame.

11. The transportable seat system of claim 10, wherein said first end of said cover is attached about said bar member and wherein said second end of said cover is attached about said outer portion of said upper frame.

12. The transportable seat system of claim 10, wherein said upper portion of said lower frame is angled frontwardly from said lower portion of said lower frame.

13. The transportable seat system of claim 10, wherein said lower frame has an inverted U-shaped structure.

14. The transportable seat system of claim 10, wherein said upper frame has a U-shaped structure.

15. The transportable seat system of claim 10, wherein said lower frame includes a pair of extended leg portions.

16. The transportable seat system of claim 15, including a cross member extending between said pair of extended leg portions.

17. The transportable seat system of claim 10, wherein said outer portion of said upper frame is angled with respect to said inner portion.

18. The transportable seat system of claim 10, wherein said cover is taut about said upper portion of said lower frame when said upper frame is in said expanded position.

19. A transportable seat system, comprising:

a lower frame having a lower portion and an upper portion;

an upper frame having an inner portion and an outer portion, wherein said inner portion is pivotally attached to said upper portion of said lower frame at a pivot point;

a bar member extending between said lower frame and said upper frame at said pivot point; and a cover having a first end and a second end, wherein said cover is attached about said lower frame and said upper frame, wherein said first end of said cover is attached about said bar member and wherein said second end of said cover is attached about said outer portion of said upper frame.

20. The transportable seat system of claim 19, wherein said upper portion of said lower frame is angled frontwardly from said lower portion of said lower frame.

\* \* \* \* \*